L. DETOY & A. P. SHEPARD.
STEAMING, DRYING, AND COOLING APPARATUS.
APPLICATION FILED JULY 11, 1910.
998,236.
Patented July 18, 1911.
2 SHEETS—SHEET 1.
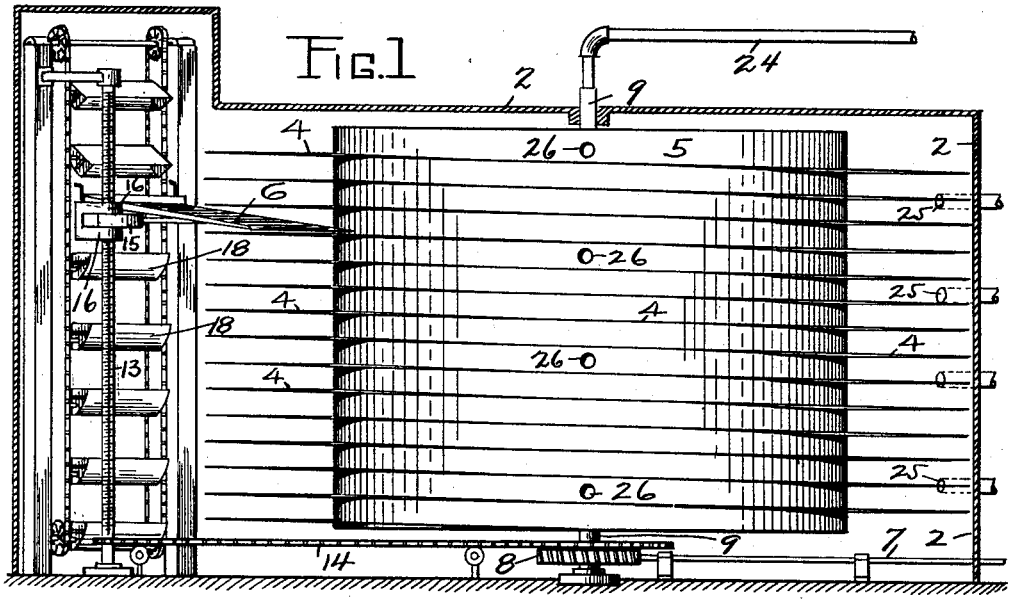
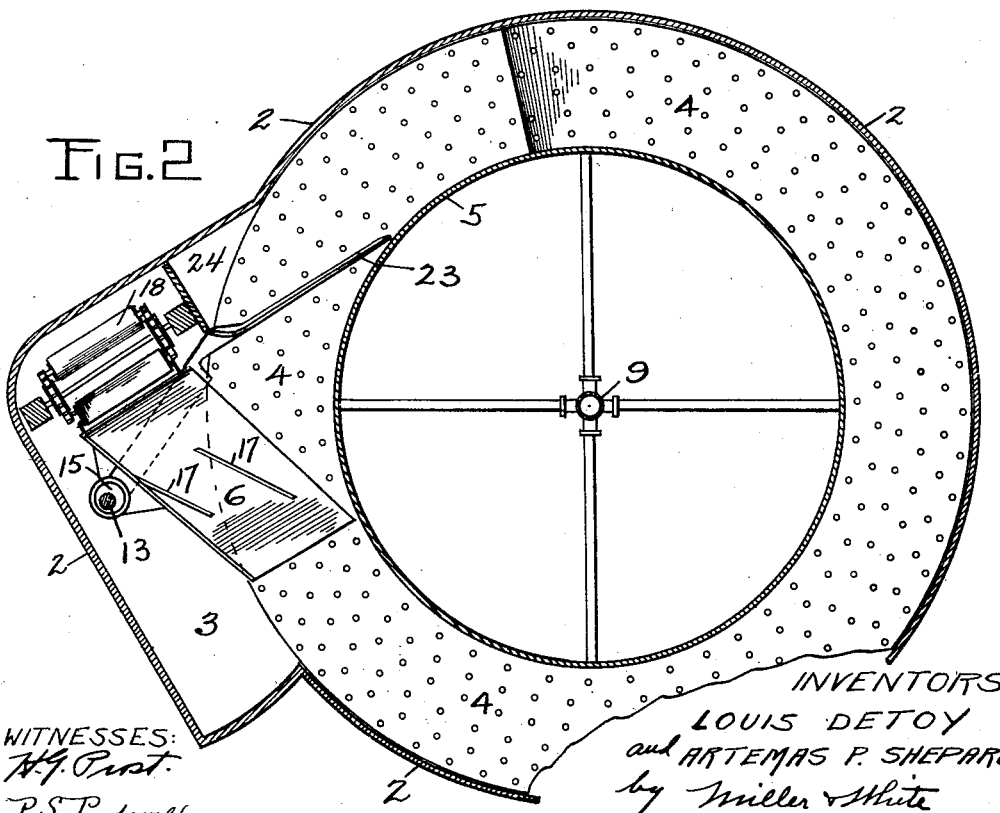
WITNESSES:
INVENTORS.
LOUIS DETOY
and ARTEMAS P. SHEPARD
by Miller & White
their attorneys.

L. DETOY & A. P. SHEPARD.
STEAMING, DRYING, AND COOLING APPARATUS.
APPLICATION FILED JULY 11, 1910.
998,236.
Patented July 18, 1911.
2 SHEETS—SHEET 2.
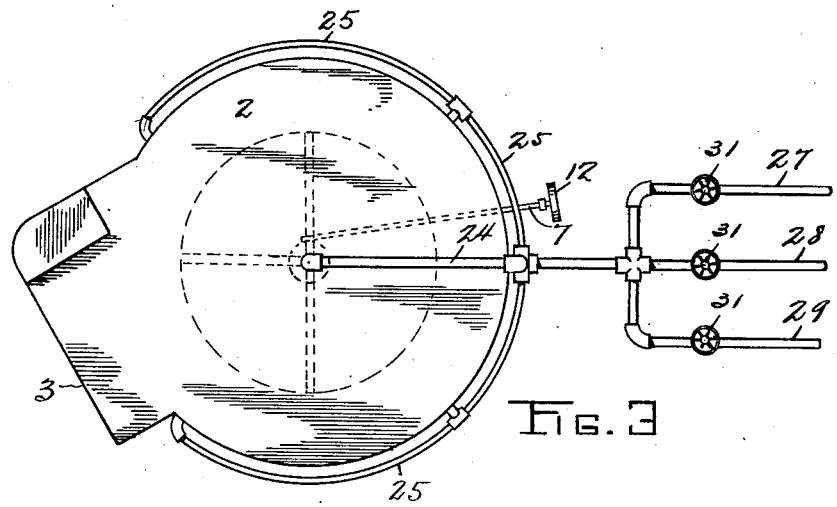
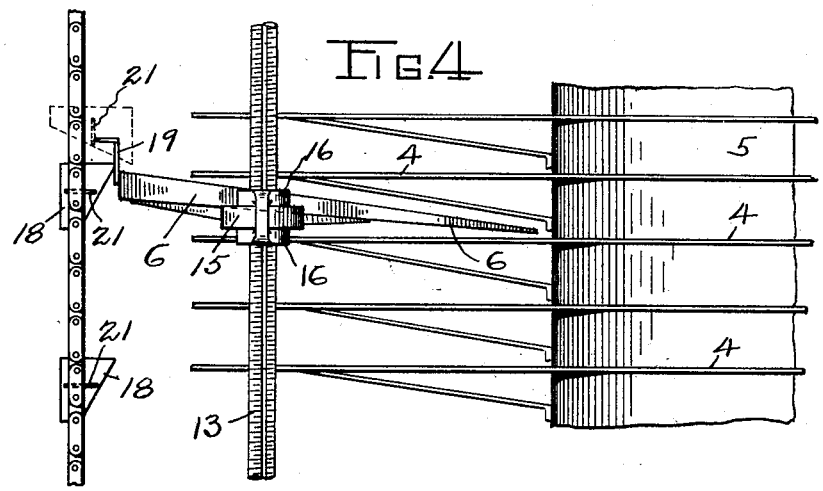
WITNESSES:
INVENTORS
LOUIS DETOY
and ARTEMAS P. SHEPARD
by Miller & White
THEIR Attorney.

UNITED STATES PATENT OFFICE.

LOUIS DETOY AND ARTEMAS P. SHEPARD, OF FRESNO, CALIFORNIA.

STEAMING, DRYING, AND COOLING APPARATUS.

998,236. Specification of Letters Patent. Patented July 18, 1911.

Application filed July 11, 1910. Serial No. 571,377.

*To all whom it may concern:*

Be it known that we, LOUIS DETOY and ARTEMAS P. SHEPARD, citizens of the United States, and residents of the city of Fresno, county of Fresno, and State of California, have invented certain new and useful Improvements in Steaming, Drying, and Cooling Apparatus, of which the following is a specification.

This invention relates to a steaming, drying and cooling apparatus for raisins, fruits, nuts and other similar articles, which are adapted to be subjected to these processes to render them more salable, or to alter their physical condition prior to further processes.

The apparatus is particularly adapted to be used in the preparation of seeded raisins for the market. In the production of raisins from grapes on a large scale at the present time, it is the practice to expose them to heated air of various degrees of humidity in order to facilitate the removal of the cap stems and the seeds. This apparatus is adapted to be used to dry the raisins after they have been washed, to steam or "process" them to render the skin and pulp sufficiently soft for subsequent operations or treatment and to cool the raisins.

In this specification we will describe the apparatus as used for treating raisins, but it is evident that other fruits and nuts could be treated with equal efficiency.

The present invention has for its object the production of a simple and efficient apparatus whereby raisins may be submitted to either of the processes on a large scale and in a continuous manner.

A further object of the invention is to provide a large exposing surface within a small area, so that large quantities of raisins may be efficiently and cheaply treated.

Another object of the invention is the production of an apparatus of the class described wherein the raisins are all equally exposed to the same temperature or humidity for the same length of time.

To these objects the invention consists of a chamber or apartment, having a spirally arranged exposing surface rotatably mounted therein, means for depositing raisins on and removing them from said exposing surface and means for varying the temperature and conditions of the atmosphere in the chamber as described and claimed.

The apparatus possesses other advantageous features, which, with the foregoing, will be set forth at length in the following description where we shall outline in full that form of embodiment of the same which we have selected for illustration in the drawings accompanying and forming part of the specification.

The novelty of the invention will be included in the claims succeeding said description. From this it will be apparent that we do not restrict ourselves to the showing made by such drawings and description, as many variations may be adopted within the scope of the invention as expressed in said claims.

Referring to the drawings: Figure 1 is an elevation partly in section, showing the exposing surface and the means for depositing the raisins on the surface. Fig. 2 is a horizontal cross section of the apparatus shown in Fig. 1. Fig. 3 is a plan or top-view of the apparatus showing the arrangement of the air and steam pipes. Fig. 4 is a detail showing means of conveying raisins to the exposing surface.

The invention consists principally of an exposing surface arranged spirally on a drum adapted to be rotated, so that a large area of exposing surface may be obtained within a much smaller ground area. The exposing surface is arranged within a casing, the interior of which is adapted to be supplied with steam or air at different temperatures according to the treatment which the raisins are to undergo. By reason of the rotation of the exposing surface, the air in the chamber is thoroughly mixed or agitated so that an even temperature is obtained at all points.

The apparatus may be constructed from suitable materials, such as wood, sheet or cast metal, or the like, but the preferred construction is of sheet metal. As the device is adapted to be used successively as a processer and a drier, it is evident that if wood were used, the wood would become more or less saturated with water in the steaming process, and this water must necessarily be evaporated during the drying process, thereby reducing the efficiency of the operation on the raisins. The exposing surface may be constructed of sheet metal, wire gauze or woven fabrics, but the metal is preferred for the reason stated above, and for the additional reason that it may more readily be cleaned. The use of metal for the casing is also advantageous on account of the fact that it is a good conductor of heat. The apparatus is generally constructed in the open where it is exposed to the rays of the sun, which have a high heating effect in raisin growing localities, and assist materially in heating the interior of the casing.

The casing 2 is generally circular in cross section to conform to the shape of the exposing surface, and is provided with an offset chamber 3 in which are located the devices for feeding the raisins to the exposing surface and for removing them therefrom after they have been subjected to the necessary treatment.

The exposing surface 4 is arranged in a spiral or helix around a central drum 5 which is adapted to be rotated to bring all parts of the surface into position to receive the raisins from the feed table 6. The drum 5 may be rotated by any suitable means, and in the drawings we have shown the shaft 7 provided with a worm-wheel on the inner end adapted to engage the spiral-gear 8 on the shaft 9 of the drum. A pulley 12 on the outer end of the shaft is arranged to be connected with a source of power to rotate the drum.

As the drum is revolved, the spiral progresses upward, and it is evident that some means must be employed to raise the feed table 6 in time with the upward movement of the exposing surface. For this purpose, we have provided the upright feed-shaft 13 which is adapted to be revolved at a speed sufficient to raise the feed table at the same rate that the spiral exposing surface progresses upward. Various devices may be employed to rotate the feed-shaft 13, and in the drawings we have shown one method whereby it is connected to the shaft of the drum 5 by the chain 14.

For the purpose of securing an even feed of the raisins from the feed table 6 to the exposing surface, the feed table is arranged to vibrate as it moves upwardly. The vibrating or shaking motion is obtained by means of an eccentric 15 loosely keyed to the feed-shaft 13, so that it is slidable longitudinally thereon and rotatable therewith. The eccentric is advanced on the feed-shaft by means of the screw-threaded collars 16, connected together and arranged above and below the eccentric. The feed-table is attached to the eccentric by any suitable means.

On account of the shaking motion of the feed-table, the raisins may have a tendency to lodge against one side of the table, and to overcome this difficulty we have provided the deflector strips 17 which have a tendency to equally distribute the raisins on the feed table and cause an equal distribution thereof on the exposing surface.

The raisins are preferably conveyed to the feed table by means of a bucket elevator provided with trip buckets 18. The buckets are formed with the point of support above the center of gravity, so that they will remain in an upright position. An arm 19 on the feed table engages a lug 21 on the side of the bucket and causes it to tilt and discharge the contents onto the table. The bucket indicated in dotted lines, Fig. 4, shows the position thereof when discharging. As the arm 19 is secured to the table, it is evident that the bucket will dump directly onto the table, regardless of the vertical position thereof.

When the entire exposing surface has become charged the feed table is swung into the chamber 3, clear of the surface and lowered to the starting position. This operation may be arranged to be accomplished automatically, or it may be done by the attendant. Suitable gear may also be applied to the feed-shaft to quickly lower the table to the starting position.

The rate of rotation of the drum carrying the exposing surface may be so regulated that the time necessary for the entire surface to pass under the feed table is equal to the time necessary to perform the required treatment of the raisins.

The raisins are removed from the exposing surface after treatment by a scraper 23 angularly arranged and lying flush with the surface. This scraper 23 is arranged in advance of the feed table, and is raised and lowered by the same mechanism which operates the feed-table. The raisins removed by the scraper are deposited in the compartment 24, from which they are removed at the bottom for further treatment. The scraper lying in advance of the feed-table removes the treated raisins from the surface just prior to the subsequent charging of the surface by the feed table. In this manner the apparatus is always charged with a quantity of raisins, the exposing surface being full except at that part lying between the scraper and the feed.

In the drawings we have shown a perforated exposing surface to allow the air at the required temperature to reach all parts of the raisins and also to allow the air to pass freely between the rows of the exposing surface. The perforations are merely to indicate that the surface may be perforated.

Air in various conditions of temperature and humidity is conducted to the apparatus and distributed at various points therein by means of the pipes 24 and 25 entering the drum and casing respectively. Within the drum the pipes 26 convey the air outward to the annular space occupied by the exposing surface, and the pipes 25 enter the annular space through the walls of the casing. In this manner the air or steam currents are directed across the exposing surface and the action on the raisins thereon is rapid and efficient. These various pipes are arranged so that a constant and uniform condition of the air within the casing may be obtained.

The pipes 24 and 25 are supplied with hot air, cold air, or steam from the pipes 27—28—29, which are connected to suitable reservoirs containing air or steam under the required conditions. Valves 31 are arranged in these supply pipes so that the condition of the air admitted to the chamber may be regulated to suit the process.

It is evident that the arrangement of the air and steam pipes, and of the feeding apparatus may be varied without departing from the spirit of our invention, and also that many other mechanical details may be changed and varied and still fall within the scope of our invention.

We claim:

1. In an apparatus of the class described, a continuous spirally arranged exposing surface arranged about a vertical axis and means for directly depositing the material over the entire surface.

2. In an apparatus of the class described, the combination of a casing, a drum therein rotatable on a vertical axis, a spirally arranged exposing surface on said drum, means for depositing material on the exposing surface, means in advance of the depositing means for removing the previously deposited material from said surface and means for maintaining a given condition of atmosphere within the casing.

3. In an apparatus of the class described, a spirally arranged exposing surface, a feed-table for depositing material on the surface and means for moving the feed-table in time with the progression of the spiral.

4. In an apparatus of the class described, a spirally arranged exposing surface adapted to be rotated, a vibrating feed-table for depositing the material on the surface, a scraper for removing the material from the surface and means for moving the table and scraper vertically in time with the vertical progression of the spiral.

5. In an apparatus of the class described, a casing, a spirally arranged exposing surface adapted to be rotated within the casing, a feed table for depositing material on the surface, means for moving the feed table in time with the progression of the spiral and means for maintaining a given condition of atmosphere within the casing.

6. In an apparatus of the class described, a spirally arranged exposing surface adapted to be rotated, means for directing currents of air across the exposing surface and means for depositing material on the surface, said means being movable in time with the progression of the spiral.

LOUIS DETOY.
ARTEMAS P. SHEPARD.

Witnesses:
W. A. SUTHERLAND,
H. E. BARBOUR.

Copies of this patent may be obtained for five cents each, by addressing the "Commissioner of Patents, Washington, D. C."